(12) United States Patent
Hirata et al.

(10) Patent No.: US 9,592,772 B2
(45) Date of Patent: Mar. 14, 2017

(54) ZN—AL—MG BASED ALLOY HOT-DIP PLATED STEEL SHEET, AND METHOD FOR PRODUCING THE SAME

(75) Inventors: Kentaro Hirata, Hiroshima (JP); Yukio Katagiri, Hiroshima (JP); Susumu Fujiwara, Hiroshima (JP); Kazuaki Hosomi, Osaka (JP); Masaaki Uranaka, Osaka (JP)

(73) Assignee: NISSHIN STEEL CO., LTD., Tokyo (JP)

(*) Notice: Subject to any disclaimer, the term of this patent is extended or adjusted under 35 U.S.C. 154(b) by 306 days.

(21) Appl. No.: 14/001,928

(22) PCT Filed: Feb. 28, 2012

(86) PCT No.: PCT/JP2012/054926
§ 371 (c)(1),
(2), (4) Date: Aug. 28, 2013

(87) PCT Pub. No.: WO2012/118073
PCT Pub. Date: Sep. 7, 2012

(65) Prior Publication Data
US 2013/0337287 A1 Dec. 19, 2013

(30) Foreign Application Priority Data

Feb. 28, 2011 (JP) .................................. 2011-043334

(51) Int. Cl.
| C22C 38/04 | (2006.01) |
| C22C 38/14 | (2006.01) |
| B60R 13/00 | (2006.01) |
| C21D 8/02 | (2006.01) |
| C23C 2/06 | (2006.01) |
| C23C 2/40 | (2006.01) |
| B32B 15/01 | (2006.01) |
| C22C 18/04 | (2006.01) |
| C22C 38/00 | (2006.01) |
| C22C 38/02 | (2006.01) |
| C22C 38/06 | (2006.01) |
| C22C 38/28 | (2006.01) |
| C22C 38/38 | (2006.01) |
| C23C 2/02 | (2006.01) |
| C22C 23/02 | (2006.01) |
| C22C 23/04 | (2006.01) |
| C22C 38/12 | (2006.01) |
| C22C 38/32 | (2006.01) |

(52) U.S. Cl.
CPC ............ B60R 13/00 (2013.01); B32B 15/013 (2013.01); C21D 8/0205 (2013.01); C21D 8/0278 (2013.01); C22C 18/04 (2013.01); C22C 23/02 (2013.01); C22C 23/04 (2013.01); C22C 38/001 (2013.01); C22C 38/002 (2013.01); C22C 38/02 (2013.01); C22C 38/04 (2013.01); C22C 38/06 (2013.01); C22C 38/12 (2013.01); C22C 38/14 (2013.01); C22C 38/28 (2013.01); C22C 38/32 (2013.01); C22C 38/38 (2013.01); C23C 2/02 (2013.01); C23C 2/06 (2013.01); C23C 2/40 (2013.01); C21D 2211/004 (2013.01); C21D 2211/005 (2013.01); Y10T 428/12799 (2015.01)

(58) Field of Classification Search
None
See application file for complete search history.

(56) References Cited

U.S. PATENT DOCUMENTS

| 5,948,183 | A | * | 9/1999 | Okada | C21D 8/0226 148/330 |
| 2003/0054195 | A1 | * | 3/2003 | Ishii | C21D 8/0278 428/653 |
| 2003/0063996 | A1 | * | 4/2003 | Funakawa | B32B 15/013 420/124 |
| 2006/0191612 | A1 | * | 8/2006 | Yoshida | C22C 38/12 148/603 |
| 2009/0095381 | A1 | * | 4/2009 | Ariga | C21D 9/46 148/507 |

(Continued)

FOREIGN PATENT DOCUMENTS

| JP | 5-263145 | 10/1993 |
| JP | 2003-003238 | 1/2003 |

(Continued)

Primary Examiner — Adam Krupicka
(74) Attorney, Agent, or Firm — Clark & Brody

(57) ABSTRACT

[Problem] To provide a steel sheet hot-dip-plated with a Zn—Al—Mg-based alloy coating, which is remarkably improved in point of all the burring workability, the liquid metal embrittlement cracking resistance and the corrosion resistance in the welded part thereof, as a steel material favorable for arc-welded structural members.

[Means for Resolution] A plated steel sheet having a Zn—Al—Mg-based alloy coating layer formed by hot-dipping on the surface of a base steel sheet for welded structural members, wherein the base steel sheet has a specific chemical composition and has a metallographic structure of such that Ti-containing precipitates having a mean particle diameter of at most 20 nm are dispersed in the matrix formed of a ferrite phase therein, and wherein the liquid metal embrittlement cracking sensitivity index H3 value of the base steel sheet represented by the following formula (3) and indicating the relationship between the contents of the steel components and the thickness t (mm) of the steel sheet is at most 2.90:

$$H3\ \text{Value} = C/0.2 + Si/5.0 + Mn/1.3 + Cr/1.0 + Mo/1.2 + 0.4t - 0.7(Cr+Mo)^{1/2} \quad (3)$$

25 Claims, 3 Drawing Sheets

(56) References Cited

U.S. PATENT DOCUMENTS

2011/0067595 A1\* 3/2011 Bourgier ................ C23C 2/003
                                                                                       104/139

FOREIGN PATENT DOCUMENTS

| JP | 2003-321736 | 11/2003 |
|---|---|---|
| JP | 2006-097129 | 4/2006 |
| JP | 2006-249521 | 9/2006 |
| JP | 2009-228080 | 10/2009 |
| WO | 2010/104086 | 9/2010 |

\* cited by examiner

Cyclic Corrosion Test (CCT) Condition (JASO M606-91)

One Cycle

ZN—AL—MG BASED ALLOY HOT-DIP PLATED STEEL SHEET, AND METHOD FOR PRODUCING THE SAME

TECHNICAL FIELD

The present invention relates to a Zn—Al—Mg-based alloy hot-dip plated steel sheet, which is excellent in liquid metal embrittlement cracking resistance and is suitable for various arc-welded structural members of typically automobile underbody members such as suspension arms, other suspension members, etc., and to a method for producing the steel sheet.

BACKGROUND ART

Automobile underbody members such as suspension arms and other suspension members have heretofore been produced by forming a hot-rolled steel sheet into a predetermined form according to press-forming or the like, then assembling the formed sheets by arc-welding and thereafter coating the welded product according to cationic electrodeposition coating for application to practical use. However, at around the weld beads and the weld bead toes, Fe scale forms on the surface of the steel sheet owing to the welding heat input during arc welding. Owing to the vibration of running automobiles, the scale may peel away due to fatigue along with the cationic electrodeposition coating, and in such a case, corrosion may progress from that site to cause plate thickness reduction. Accordingly, strength designing of underbody members must include plate thickness reduction owing to corrosion, and heretofore, from the viewpoint of collision safety, hot-rolled steel sheets having a thickness of from 3 to 4 mm and having a tensile strength on a level of from 340 to 440 MPa have been much used.

Recently, further collision safety and reduction in weight have become desired, and a need of using a high-strength steel sheet having a strength of at least 590 MPa for underbody members has increased. Also, enhancement of anti-rust property is required for obtaining a long life. Further, underbody members are also required to have burring workability (hole-expanding workability) in addition to the above-mentioned high strength and corrosion resistance. Burring workability is a characteristic of indicating that the hole formed by punching or the like can be further worked with no cracking in the subsequent working process.

Patent Reference 1 discloses a high-strength galvanealed steel sheet having excellent burring workability. However, when a Zn based alloy plated steel sheet is arc-welded, then the plating layer disappears by evaporation especially at around the weld bead toes that are exposed to high temperatures, and Fe scale forms in that part. Consequently, the drawback of the heretofore-existing hot-rolled steel sheets that the coating film readily peels away along with the Fe scale could not be still overcome even by the use of Zn based alloy plated steel sheets.

Patent Reference 2 discloses a Zn—Al—Mg-based alloy hot-dip plated steel sheet, which has a higher corrosion resistance than that of ordinary hot-dip galvanized steel sheets. In this case, the metallographic structure is a dual-phase structure comprising ferrite, which is main phase, and at least one of pearlite, bainite and martensite, but the hardness difference between the two phases is great, and therefore, the plated steel sheet of the type could hardly get good burring workability.

Patent Reference 3 proposes a liquid metal embrittlement sensitivity index E value to be determined on the basis of the composition of alloying components, for the purpose of stably retarding the liquid metal embrittlement cracking in welding of a steel sheet plated with a zinc-based alloy coating. However, the present inventors' investigation revealed that, even according to the method described in this patent reference, it is not always easy to stably evade the liquid metal embrittlement cracking in welding with a Zn—Al—Mg-based alloy hot-dip plated steel sheet.

CITATION LIST

Patent References

Patent Reference 1: JP-A 5-263145
Patent Reference 2: JP-A 2009-228080
Patent Reference 3: JP-A 2006-249521

SUMMARY OF THE INVENTION

Problems that the Invention is to Solve

As described above, when a high-strength galvanealed steel sheet is used for welded structural members such as automobile underbody members and the like that are assembled by arc-welding, then the corrosion resistance of the welded parts is insufficient and therefore thin-walled designing is difficult. In addition, in case where the metallographic structure of the base steel sheet is a dual-phase structure, the burring workability of the base steel sheet is not good. Further, regarding the liquid metal embrittlement cracking resistance of the Zn—Al—Mg-based alloy hot-dip plated steel sheet, further improvement of the property of the plated steel sheet is desired.

In consideration of these problems, an object of the present invention is to provide a Zn—Al—Mg-based alloy hot-dip plated steel sheet, which has been remarkably improved in point of all the burring workability, the liquid metal embrittlement cracking resistance and the corrosion resistance of the welded parts thereof, as a steel material favorable for arc-welded structural members.

Means for Solving the Problems

As a result of detailed studies, the present inventors have obtained the following findings:

(i) Use of a Zn—Al—Mg-based alloy hot-dip plated steel sheet for welded structural members assembled by arc welding improves the corrosion resistance of the welded parts.

(ii) For preventing liquid metal embrittlement cracking in arc welding, which is often problematic in Zn—Al—Mg-based alloy hot-dip plated steel sheets, it is extremely effective to consider the influence thereon of the thickness of the base steel sheet of a steel sheet to be plated, in addition to the composition designing for the base steel sheet, and to relax the tensile stress caused by the thermal shrinkage in cooling by suitably utilizing the volume expansion through martensitic transformation or the like during the cooling step in welding; and by the "liquid metal embrittlement cracking sensitivity index" that is a function between chemical composition and plate thickness, the requirements for the base steel sheet excellent in liquid metal embrittlement cracking resistance can be defined.

(iii) The burring workability can be enhanced by making the base steel sheet have a metallographic structure in which Ti-containing precipitates having a mean particle diameter of at most 20 nm are dispersed in the matrix formed of a ferrite phase therein.

The present invention has been achieved on the basis of these findings. Patent Reference 3 proposes a liquid metal embrittlement sensitivity index E value; however, the patent reference does not disclose the fact that liquid metal embrittlement is influenced by the thickness of the base plate, and does not show any knowledge of preventing liquid metal embrittlement cracking by controlling the metallographic structure in weld solidification.

In the present invention, there is provided a plated steel sheet having a Zn—Al—Mg-based coating layer formed by hot-dipping on the surface of a base steel sheet, wherein the base steel sheet has a chemical composition comprising, in terms of % by mass, C of from 0.010 to 0.100%, Si of from 0.01 to 1.00%, Mn of from 0.50 to 2.50%, P of from 0.005 to 0.050%, S of from 0.001 to 0.020%, N of from 0.001 to 0.005%, Ti of from 0.02 to 0.20%, B of from 0.0005 to 0.0100%, Al of from 0.005 to 0.100%, Cr of from 0 to 1.00%, Mo of from 0 to 1.00%, Nb of from 0 to 0.10%, V of from 0 to 0.10%, and a balance of Fe an inevitable impurities, and has a metallic structure of such that Ti-containing precipitates having a mean particle diameter of at most 20 nm are dispersed in the matrix formed of a ferrite phase therein.

The base steel sheet not containing the optional elements Cr and Mo is such that the liquid metal embrittlement cracking sensitivity index H1 value thereof represented by the following formula (1) and indicating the relationship between the contents of the steel components and the thickness t (mm) of the steel sheet is at most 2.84:

$$H1\ \text{Value}=C/0.2+Si/5.0+Mn/1.3+0.4t \quad (1)$$

The base steel sheet containing at least one optional element of Cr and Mo is such that the liquid metal embrittlement cracking sensitivity index H2 value thereof represented by the following formula (2) and indicating the relationship between the contents of the steel components and the thickness t (mm) of the steel sheet is at most 3.24:

$$H2\ \text{Value}=C/0.2+Si/5.0+Mn/1.3+Cr/1.0+Mo/1.2+0.4t \quad (2)$$

In place of the above-mentioned formula (1) or formula (2), the following formula (3) may also be applicable here. In the case, the base steel sheet has the relationship between the contents of the steel components and the thickness t (mm) of the steel sheet of such that the liquid metal embrittlement cracking sensitivity index H3 value thereof represented by the formula (3) is at most 2.90. The H3 value of the formula (3) is a liquid metal embrittlement cracking sensitivity index applicable to the steel sheet irrespective of the presence or absence of Cr and Mo therein.

$$H3\ \text{Value}=C/0.2+Si/5.0+Mn/1.3+Cr/1.0+Mo/1.2+0.4t-0.7(Cr+Mo)^{1/2} \quad (3)$$

In the site of the element symbol in the formulae (1) to (3), the content of the corresponding element (% by mass) in the base steel sheet is introduced. In applying the formula (2) or the formula (3) to a case where any of Cr or Mo is not added to the steel sheet, 0 (zero) is introduced into the site of the element symbol.

The plating composition of the Zn—Al—Mg-based alloy hot-dip plated steel sheet comprises, for example in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

As a method for producing the Zn—Al—Mg-based alloy hot-dip plated steel sheet mentioned above, the invention also provides a method for producing a Zn—Al—Mg-based alloy hot-dip plated steel sheet for welded structural members, which comprises a step of sequentially processing a steel sheet having the above-mentioned chemical composition for hot rolling, pickling, and annealing and Zn—Al—Mg-based hot-dipping in a continuous hot-dipping line to thereby produce a plated steel sheet having, on the surface of the base steel sheet, a Zn—Al—Mg-based plating layer formed thereon, wherein:

the steel sheet is hot-rolled to have a thickness t (mm), with which the liquid metal embrittlement cracking sensitivity index H1 value thereof represented by the above-mentioned formula (1) is at most 2.84, the liquid metal embrittlement cracking sensitivity index H2 value thereof represented by the above-mentioned formula (2) is at most 3.24, or the liquid metal embrittlement cracking sensitivity index H3 value thereof represented by the above-mentioned formula (3) is at most 2.90, the coiling temperature is from 550 to 680° C., and the annealing temperature in the continuous hot-dipping line is from 500 to 700° C. In this, the mode of employing which of the above-mentioned formulae (1) to (3) is as described above. The thickness t of the steel sheet is, for example, from 1.5 to 6.0 mm, but preferably from 2.0 to 4.0 mm.

Advantageous Effects of Invention

According to the invention, there is provided a Zn—Al—Mg-based alloy hot-dip plated steel sheet for welded structures, which has good burring workability, which does not bring about liquid metal embrittlement cracking during arc welding, and which is excellent in corrosion resistance in arc-welded parts.

MODE FOR CARRYING OUT THE INVENTION

Figure 1:
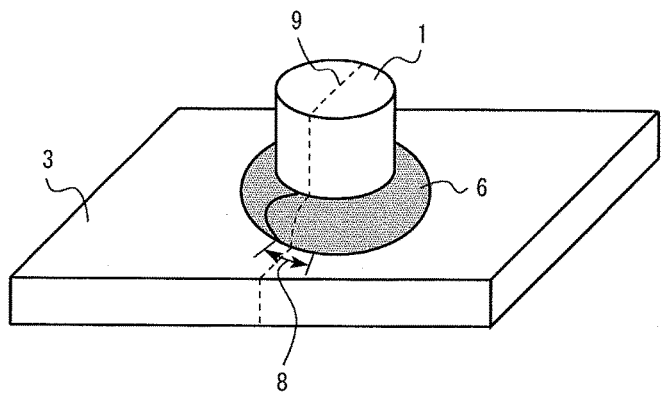
FIG. 1 A perspective view explaining the shape of a boss-welding test piece.

Unless otherwise specifically indicated in the following, "%" in composition of the base steel or plated layer is "% by mass".

[Components of Base Steel Material]

<C: 0.01 to 0.10%>

C is an element that forms a Ti-containing carbide and finely precipitates in the ferrite phase of the matrix, thereby playing a role in securing the strength of steel. When the C content is less than 0.01%, it would be often difficult for the steel to obtain high strength (for example, not less than 590

MPa) suitable for welded structural members such as automobile underbody members, etc., but when more than 0.10%, then the precipitates may coarsen and a second phase such as bainite or the like may tend to form, thereby providing a factor of lowering the burring workability of the steel.

<Si: 0.01 to 1.00%>

Si is also an element that plays a role in securing the strength of steel. Moreover, even though the amount thereof to be added to steel is increased, Si hardly worsens the workability of the steel, as compared with any other element effective for increasing the strength of steel; and therefore Si is an element effective for increasing the strength of steel. For sufficiently attaining the effects, Si must be added in an amount of at least 0.01%. However, when the amount is more than 1.00%, an oxide may readily form on the surface of the steel sheet in heating in a hot-dipping line, therefore detracting from the platability of the steel sheet.

<Mn: 0.50 to 2.50%>

Mn is an element effective for solid solution strengthening. When the Mn content is less than 0.50%, then it would be difficult to stably attain a strength of 590 MPa or more; but when more than 2.50%, then segregation readily occurs and the burring workability of the steel may lower.

<P: 0.005 to 0.050%>

P is also an element effective for solid solution strengthening, and its content of not less than 0.005% is effective. However, when the content is more than 0.050%, then segregation readily occurs and the burring workability of the steel may lower.

<S: 0.001 to 0.020%>

S readily forms a sulfide with Ti and Mn, and the sulfide worsens the burring workability of the steel sheet. As a result of various investigations, S must be at most 0.020%. However, excessive desulfurization would increase operation load of steel production, and in general, therefore, the S content may be at least 0.001%.

<N: 0.001 to 0.005%>

When remaining in steel as a solute N, the N forms BN and therefore reduces the amount of B effective for liquid metal embrittlement cracking resistance of steel. As a result of investigations, the N content is limited to be at most 0.005%, but in general, even when N exists in an amount of 0.001% or so, there occurs no problem.

<Ti: 0.02 to 0.20%>

Ti has a high affinity to N and fixes N in steel as TiN therein, and therefore, adding Ti to steel is extremely effective for securing the amount of B that increases the liquid metal embrittlement cracking resistance of steel. In addition, Ti is necessary for forming fine carbide particles by bonding to C, and is therefore one important element in the invention. For sufficiently attaining the effects, Ti must be in the steel in an amount of at least 0.02%. However, when more than 0.20%, the workability of steel would worsen.

<B: 0.0005 to 0.0100%>

B is an element that segregates in the crystal grain boundary to increase the interatomic bonding force, and is effective for preventing liquid metal embrittlement cracking. Its action is exhibited by the B content of at least 0.0005%. On the other hand, when the B content is more than 0.0100%, then a boride is formed to often worsen the workability of steel.

<Al: 0.005 to 0.100%>

Al is added as a deoxidizing agent during steel production. For attaining its effect, the Al content of at least 0.005% is desired. However, when the Al content is more than 0.100%, then the ductility of steel would lower.

<Cr: 0 to 1.00%>

Like B, Cr segregates in the austenite grain boundary in the heat-affected zone during the cooling process in arc welding, thereby exhibiting an effect of preventing liquid metal embrittlement cracking. Accordingly, Cr may be contained in steel as an optional component. In case where Cr is added to steel, it is more effective to secure its content of at least 0.10%. However, any excessive Cr would be a factor of lowering the workability of steel, and therefore, the Cr content is limited to be at most 1.00%.

<Mo: 0 to 1.00%>

Like Cr and B, Mo segregates in the austenite grain boundary in the heat-affected zone during the cooling process in arc welding, thereby exhibiting an effect of preventing liquid metal embrittlement cracking. Accordingly, Mo may be contained in steel as an optional component. In case where Mo is added to steel, it is more effective to secure its content of at least 0.05%. However, Mo is an expensive element, and therefore in case where Mo is added to steel, its amount is not more than 1.00%.

<Nb: 0 to 0.10%>

Nb prevents austenitic crystal grains from coarsening during heating and hot rolling, and is effective for refining the ferritic crystal grains after cooling. In addition, Nb forms a composite carbide containing C and contributes toward increasing the strength of steel. Accordingly, Nb may be added to steel as an optional component. In case where Nb is added to steel, it is more effective to secure the Nb content of at least 0.01%. However, excessive Nb addition to steel is uneconomical and the amount of Nb, if added to steel, is at most 0.10%.

<V: 0 to 0.10%>

Like Nb, V prevents austenitic crystal grains from coarsening during heating and hot rolling, and is effective for refining the ferritic crystal grains in steel. In addition, like Ti, V forms a composite carbide containing C and contributes toward increasing the strength of steel. Accordingly, V may be added to steel as an optional component. In case where V is added to steel, it is more effective to secure the V content of at least 0.05%. However, excessive V addition to steel is uneconomical and the amount of V, if added to steel, is at most 0.10%.

[H1 Value]

The H1 value is a liquid metal embrittlement cracking sensitivity index employed in the case not containing the optional elements Cr and Mo. The material having a large value H1 may have a large maximum cracking depth to be generated by liquid metal embrittlement cracking. The H1 value is a function of the contents of the steel components and the thickness t (mm) of the base steel sheet (steel sheet to be plated), and is defined by the formula (1).

$$H1\ \text{Value} = C/0.2 + Si/5.0 + Mn/1.3 + 0.4t \quad (1)$$

Here, in the site of the element symbol in the formula (1), the content of the corresponding element (% by mass) in the base steel sheet is introduced; and in the site of t, the mean thickness of the base steel sheet of a steel sheet to be plated is introduced with a unit of 0.1 mm. (The same shall apply to the formula (2) and the formula (3) to be mentioned below.)

Liquid metal embrittlement cracking is a phenomenon that, when tensile stress caused by thermal shrinkage has occurred in the weld metal and the heat-affected zone of the base material in the cooling process of welding, the plating metal existing as a liquid state on the surface of the base material penetrates into the crystal grain boundary of the base material to cause cracking. In particular, cracking readily starts from the surface of the base material extremely close to the weld toes. Zn—Al—Mg-based plating alloy can keep a liquid state up to about 400° C. or so. Accordingly, it is effective to relax as much as possible the tensile stress at the time when the material temperature is about 400° C. or more in the cooling step after welding, for preventing liquid metal embrittlement cracking.

In the invention, as a method of relaxing the tensile stress, used is volume expansion through martensitic transformation or the like of the base material (base steel sheet). The type of the steel to which the invention is targeted is, as described above, a steel in which the matrix is controlled to be a ferrite single phase; however, during arc welding, the steel is rapidly cooled, and therefore there may occur martensitic transformation in the heat-affected zone of the steel. In the formula (1), C, Si and Mn are elements that have a high effect of changing the martensitic transformation temperature (Ms point) to a lower temperature side, among the steel components. The content of these elements is specifically defined here so that the martensitic transformation could occur in the region at 400° C. or higher at which liquid metal embrittlement cracking readily occurs. Using the volume expansion accompanied by the martensitic transformation, the tensile stress to cause the liquid metal embrittlement cracking is relaxed.

The term of the thickness t in the right-hand side of the formula (1) is based on the consideration that, when the thickness is larger, then the cooling rate lowers and the tensile stress increases, and therefore the requirement for "contributing toward the Ms point depression by the steel components" is to be much severer. Heretofore, as a method for improving the liquid metal embrittlement cracking resistance of a steel sheet plated with a zinc-based alloy, many trials of controlling the contents of the steel components have been made. However, even according to those methods, the problem of liquid metal embrittlement cracking could not be still solved but has often remained as such. As a result of detailed investigations, the present inventors have considered that the tensile stress occurring situation varies depending on the thickness of the base steel material, and have defined the liquid metal embrittlement cracking sensitivity indices, H1 value and the H2 value and H3 value to be mentioned below that are applicable to different steel sheet thicknesses.

In a case of a Zn—Al—Mg-based alloy hot-dip plated steel sheet in which the contents of the steel components of the base steel material fall within the above-mentioned ranges and where the base steel sheet does not contain Cr and Mo, the relationship between the contents of the steel components and the thickness of the base steel sheet is so controlled that the H1 value could be at most 2.84, whereby the liquid metal embrittlement cracking in arc welding can be noticeably prevented. The liquid metal embrittlement cracking resistance is on such a level that the maximum cracking depth in the severe evaluation method according to the liquid metal embrittlement cracking test to be mentioned below is at most 0.1 mm, and indicates excellent practicability of the plated steel sheet.

[H2 Value]

The H2 value is a liquid metal embrittlement cracking sensitivity index employed in the case containing at least one optional element of Cr and Mo, and is defined by the formula (2). The material having a large value H2 may have a large maximum cracking depth to be generated by liquid metal embrittlement cracking.

$$\text{H2 Value}=C/0.2+Si/5.0+Mn/1.3+Cr/1.0+Mo/1.2+0.4t \qquad (1)$$

Like the above-mentioned H1 value, the H2 value is a function of the contents of the steel components and the thickness t (mm) of the base steel sheet (steel sheet to be plated). The H2 value differs from the H1 value in that the former has the terms of Cr and Mo having the function of changing the Ms point to the lower temperature side, but the technical meaning of the H2 value is the same as that of the H1 value. In a case of a Zn—Al—Mg-based alloy hot-dip plated steel sheet in which the contents of the steel components of the base steel material fall within the above-mentioned ranges and where the base steel sheet to be plated contains at least one of Cr and Mo, the relationship between the chemical composition and the thickness of the base steel sheet is so controlled that the H2 value could be at most 3.24, whereby the liquid metal embrittlement cracking in arc welding can be noticeably prevented. The liquid metal embrittlement cracking resistance is on such a level that the maximum cracking depth of the base metal in the severe evaluation method according to the liquid metal embrittlement cracking test to be mentioned below is at most 0.1 mm, and indicates excellent properties of the plated steel sheet on a practicable level.

[H3 Value]

The H3 value is a liquid metal embrittlement cracking sensitivity index employed in any case irrespective of the presence or absence of the optional components Cr and Mo, and is defined by the formula (3). The material having a large value H3 may have a large maximum cracking depth to be generated by liquid metal embrittlement cracking.

$$\text{H3 Value}=C/0.2+Si/5.0+Mn/1.3+Cr/1.0+Mo/1.2+0.4t-0.7(Cr+Mo)^{1/2} \qquad (1)$$

The technical meaning of the H3 value is the same as that of the H1 value and the H2 value; however, when the H3 value is employed, then the liquid metal embrittlement cracking resistance can be evaluated by the constant upper value 2.90 irrespective of the presence or absence of the optional elements Cr and Mo in the steel sheet. According to the definition of H3 value 2.90, base steel sheets which are to be formally outside the defined range of H2 value 3.24 but which in fact exhibit excellent liquid metal embrittlement cracking resistance can be more accurately employed as those falling within the defined range. For example, in a case of containing a slight amount of at least one of Cr and Mo, the H1 value could not be formally applied to that case; and as for the definition of H2 ≤ 3.24, the upper limit thereof is increased up to 3.24 from 2.84 of the H1 value in order that the case containing a relatively large amount of Cr and Mo could be stably evaluated, and consequently, some cases actually having excellent liquid metal embrittlement cracking resistance would be formally outside the range of H2≤3.24. The H3 value is an advanced liquid metal embrittlement cracking sensitivity index, by which the base steel sheets of such cases could be judged as acceptable as economically as possible.

[Metallographic Structure]

<Matrix>

For enhancing the burring workability thereof, it is effective that the matrix (steel base) of the metallographic structure of the base steel sheet is a ferrite single phase having good ductility.

<Ti-Containing Precipitates Having a Mean Particle Diameter Of at Most 20 Nm and Dispersed in the Ferrite Phase>

The matrix of the metallic structure of the steel sheet according to the invention is a ferrite single phase, in which Ti-containing precipitates formed during hot rolling, and owing to the precipitation-strengthening effect thereof, the strength of the steel increased to be a tensile strength of at least 600 MPa or so. For enhancing the burring workability, it is effective that the Ti-containing precipitates finely disperse in the ferrite matrix. As a result of various investigations, for enhancing both the burring workability and the tensile strength to a level of at least 600 MPa or so, it is extremely effective that the Ti-containing precipitates dispersing in the ferrite phase have a mean particle diameter of at most 20 nm. The metallographic structure of the type can be obtained by optimizing the coiling temperature in hot rolling and the annealing temperature in hot-dipping lines.

[Production Method]

The Zn—Al—Mg-based alloy hot-dip plated steel sheet mentioned above, which is excellent in liquid metal embrittlement cracking resistance and burring workability, can be produced, for example, according to a process of hot-rolling a composition-controlled steel sheet (continuously cast slab, etc.), then pickling it, and thereafter annealing and hot-dipping with a Zn—Al—Mg-based coating in a continuous hot-dipping line in that order. The production conditions in the case are described below.

<Thickness Control of Steel Sheet in Hot Rolling>

For controlling the liquid metal embrittlement cracking sensitivity index H1 value, H2 value or H3 value to fall within the above-mentioned range, composition control in the step of melting the steel components and thickness control in the step of rolling the steel are necessary. The above-mentioned production process does not include cold rolling, and therefore, the thickness control of the base steel sheet (steel sheet to be plated) is basically carried out in hot rolling. Concretely, the thickness of the steel sheet, t (mm), is controlled in hot rolling so as to satisfy H1 value 2.84, H2 value≤3.24 or H3 value 2.90.

<Coiling Temperature in Hot Rolling: 550 to 680° C.>

In order that the metallographic structure of the base steel sheet could be a ferrite single phase and in order to fully secure the amount of the Ti-containing precipitates having a mean particle diameter of at most 20 nm, the coiling temperature is from 550 to 680° C. When the coiling temperature is lower than 550° C., then the amount of the Ti-containing precipitates is insufficient and the strength of the steel would lower. If so, in addition, a second phase structure such as bainite or the like would readily form to be a cause of worsening the burring workability of the steel. On the other hand, when the coiling temperature is higher than 680° C., then the precipitates would coarsen, thereby lowering the strength of the steel and worsening the burring workability thereof.

<Annealing Temperature in Continuous Hot-Dipping Line: 550 to 700° C.>

When the annealing temperature is lower than 550° C., then the surface of the steel sheet could not be fully reduced and the platability thereof would lower. On the other hand, when the annealing temperature is higher than 700° C., then the precipitates would coarsen, thereby lowering the strength of the steel and worsening the burring workability thereof.

<Hot-Dipping with Zn—Al—Mg-Based Coating>

In the invention, any known hot-dipping method to form a Zn—Al—Mg-based coating is employable.

Al in the plating layer has an effect of enhancing the corrosion resistance of the plated steel sheet. Al added to the plating bath has an effect of preventing generation of Mg oxide dross in the bath. For fully attaining these effects, the Al content in the hot-dip plating must be at least 3.0%, and is preferably at least 4.0%. On the other hand, when the Al content is more than 22.0%, then an Fe—Al alloy layer may grow significantly in the interface between the plating layer and the base steel sheet, and the plating adhesiveness may be thereby worsened. For securing excellent plating adhesiveness, the Al content is preferably at most 15.0%, more preferably at most 10.0%.

Mg in the plating layer has an effect of forming a uniform corroded product on the surface of the plating layer to thereby greatly enhance the corrosion resistance of the plated steel sheet. In order to sufficiently exhibit the effect, the Mg content in the hot-dip plating must be at least 0.05% and is preferably at least 2.0%. On the other hand, when the Mg content is more than 10.0%, then the trouble of Mg oxide dross formation would be severer. For obtaining a plating layer of higher quality, the Mg content is preferably at most 5.0%, more preferably at most 4.0%.

When Ti and B are added to the hot-dipping bath, then a $Zn_{11}Mg_2$ phase that would give dot-like defects to the appearance of the Zn—Al—Mg-based alloy hot-dip plated steel sheet may be prevented from forming and growing on the steel sheet. Even when Ti and B are added each individually to the plating bath, it could be effective for preventing the formation of the $Zn_{11}Mg_2$ phase; however, for greatly enlarging the latitude of the production conditions, it is desirable that both Ti and B are added. For sufficiently attaining these effects, it is effective that the Ti content in hot-dip plating is at least 0.0005% and the B content is at least 0.0001%. However, when the Ti content is too much, then Ti—Al precipitates would form in the plating layer to be irregularities referred to as "fish eyes" on the plated surface, and the appearance of the plated steel sheet would be thereby worsened. Accordingly, in case where Ti is added to the plating bath, its content must be at most 0.10%, and is more preferably at most 0.01%. On the other hand, when the B content is too much, then Al—B or Ti—B precipitates would form and coarsen in the plating layer, also to be irregularities referred to as "fish eyes" on the plated surface. Accordingly, in case where B is added to the plating bath, its content must be at most 0.05%, and is more preferably at most 0.005%.

Si, if any, in the hot-dipping bath prevents the growth of the Fe—Al alloy layer, therefore enhancing the workability of the Zn—Al—Mg Based alloy hot-dip plated steel sheet. Si in the plating layer prevents the plating layer from blackening and is effective for maintaining the surface glossiness of the plating layer. For sufficiently bringing about the effect of Si, it is effective that the Si content in the hot-dipping bath is at least 0.005%. However, addition of too much Si to the hot-dipping bath would increase the amount of dross in the bath, and therefore, the amount of Si, if any, in the hot-dipping bath is within a range of not more than 2.0%.

The hot-dipping bath would be contaminated with a certain level of Fe derived from the base steel material and the pot constitutive members. In the Zn—Al—Mg plating bath, Fe would be acceptable in an amount of up to 2.0% or so. Any other elements, for example, one or more of Ca, Sr, Na, rare earth elements, Ni, Co, Sn, Cu, Cr and Mn may mix in the plating bath, but the total content thereof is preferably at most 1% by mass. The composition of the hot-dipping bath is closely reflected in the composition of the plating layer of the hot-dip-coated steel sheet.

EXAMPLES

Example 1

The steel having the composition shown in Table 1 was produced by melting, and the slab is heated at 1250° C. and then hot-rolled at a finishing rolling temperature of 880° C. and a coiling temperature of from 530 to 700° C. to give a hot-rolled steel strip. The thickness of the hot-rolled steel strip, and the above-mentioned H1 value and H2 value thereof are shown in Table 1, and the coiling temperature is in Table 4.

TABLE 1

| Steel | Chemical Composition (mass %) | | | | | | | | | | | | | Thickness (mm) | H1 Value | H2 Value | Classification |
|---|---|---|---|---|---|---|---|---|---|---|---|---|---|---|---|---|---|
| | C | Si | Mn | P | S | Al | Ti | B | Nb | V | Cr | Mo | N | | | | |
| A | 0.045 | 0.60 | 1.72 | 0.017 | 0.002 | 0.043 | 0.10 | 0.003 | — | — | — | — | 0.003 | 2.6 | 2.71 | — | Invention |
| B | 0.025 | 0.50 | 2.02 | 0.015 | 0.003 | 0.045 | 0.11 | 0.003 | — | — | — | — | 0.002 | | 2.82 | — | Sample |
| C | 0.080 | 0.40 | 1.41 | 0.022 | 0.008 | 0.036 | 0.17 | 0.004 | — | — | — | — | 0.004 | | 2.60 | — | |
| D | 0.022 | 0.10 | 2.15 | 0.018 | 0.003 | 0.033 | 0.06 | 0.005 | — | — | — | — | 0.004 | | 2.82 | — | |
| E | 0.050 | 0.90 | 1.61 | 0.013 | 0.002 | 0.044 | 0.13 | 0.003 | — | — | — | — | 0.003 | | 2.71 | — | |
| F | 0.042 | 0.50 | 1.78 | 0.017 | 0.002 | 0.043 | 0.08 | 0.003 | 0.02 | — | — | — | 0.003 | | 2.72 | — | |
| G | 0.045 | 0.60 | 1.80 | 0.017 | 0.002 | 0.043 | 0.10 | 0.003 | — | — | 0.40 | — | 0.003 | | — | 3.17 | |
| H | 0.022 | 0.30 | 1.64 | 0.018 | 0.003 | 0.033 | 0.06 | 0.005 | — | — | — | 0.20 | 0.003 | | — | 2.64 | |
| I | 0.030 | 0.30 | 1.87 | 0.022 | 0.008 | 0.068 | 0.05 | 0.002 | — | — | — | — | 0.004 | | 2.69 | — | |
| J | 0.065 | 0.70 | 1.68 | 0.022 | 0.008 | 0.036 | 0.19 | 0.004 | — | — | — | — | 0.004 | | 2.80 | — | |
| K | 0.075 | 0.30 | 1.20 | 0.023 | 0.002 | 0.033 | 0.11 | 0.003 | 0.08 | — | — | — | 0.003 | | 2.40 | — | |
| L | 0.035 | 0.40 | 1.30 | 0.016 | 0.002 | 0.045 | 0.10 | 0.003 | — | — | 0.80 | — | 0.003 | | — | 3.10 | |
| M | 0.040 | 0.65 | 1.80 | 0.020 | 0.003 | 0.040 | 0.10 | 0.003 | — | — | — | — | 0.002 | | 2.75 | — | |
| N | 0.040 | 0.40 | 1.40 | 0.017 | 0.003 | 0.033 | 0.08 | 0.003 | — | — | 0.60 | — | 0.002 | | — | 3.00 | |
| O | 0.038 | 0.32 | 1.38 | 0.017 | 0.003 | 0.033 | 0.08 | 0.003 | — | — | 0.20 | 0.10 | 0.002 | | — | 2.64 | |
| P | 0.045 | 0.55 | 1.60 | 0.020 | 0.003 | 0.045 | 0.05 | 0.003 | — | 0.09 | — | — | 0.003 | | 2.61 | — | |
| Q | 0.038 | 0.59 | 1.40 | 0.013 | 0.003 | 0.038 | 0.11 | 0.003 | — | — | — | — | 0.003 | | 2.66 | — | |
| R | 0.035 | 0.45 | 1.32 | 0.018 | 0.005 | 0.044 | 0.10 | 0.004 | 0.04 | — | — | — | 0.002 | | 2.56 | — | |
| S | 0.040 | 0.60 | 1.52 | 0.017 | 0.002 | 0.043 | 0.09 | 0.003 | — | — | 0.40 | — | 0.003 | | — | 3.17 | |
| T | 0.035 | 0.52 | 1.48 | 0.016 | 0.003 | 0.003 | 0.08 | 0.003 | 0.03 | — | — | — | 0.003 | | 2.70 | — | |
| U | 0.050 | 0.35 | 1.15 | 0.022 | 0.002 | 0.041 | 0.04 | 0.003 | — | — | — | 0.60 | 0.003 | | — | 2.98 | |
| V | 0.060 | 0.50 | 1.80 | 0.017 | 0.003 | 0.032 | <u>0.25</u> | 0.002 | — | — | — | — | 0.004 | 2.6 | 2.82 | — | Comparative |
| W | <u>0.003</u> | 0.44 | 2.01 | 0.017 | 0.003 | 0.044 | <u>0.07</u> | 0.002 | — | — | — | — | 0.004 | | 2.69 | — | Sample |
| X | 0.033 | 0.42 | 1.67 | <u>0.065</u> | 0.003 | 0.046 | 0.09 | 0.003 | — | — | — | — | 0.004 | | 2.57 | — | |
| Y | 0.044 | 0.55 | 1.60 | 0.020 | 0.003 | 0.055 | 0.12 | <u>0.0003</u> | — | — | — | — | 0.003 | | 2.60 | — | |
| Z | 0.070 | 0.60 | 2.10 | 0.022 | 0.002 | 0.044 | 0.06 | 0.003 | — | — | — | — | 0.004 | | <u>3.13</u> | — | |
| AA | 0.040 | 0.70 | 1.75 | 0.022 | 0.002 | 0.044 | 0.06 | 0.003 | — | — | 0.60 | — | 0.004 | | — | <u>3.33</u> | |
| BB | <u>0.120</u> | 0.33 | 1.60 | 0.016 | 0.003 | 0.038 | 0.05 | 0.002 | — | — | — | — | 0.004 | | <u>2.94</u> | — | |
| CC | 0.060 | 0.70 | 2.00 | 0.022 | 0.002 | 0.044 | 0.08 | 0.003 | — | — | 0.25 | 0.05 | 0.004 | | — | <u>3.31</u> | |
| DD | 0.030 | 0.15 | <u>2.58</u> | 0.022 | 0.002 | 0.044 | 0.10 | 0.003 | — | — | — | — | 0.004 | | <u>3.20</u> | — | |
| EE | 0.045 | 0.60 | 1.72 | 0.017 | 0.002 | 0.043 | 0.10 | 0.003 | — | — | — | — | 0.003 | 3.2 | <u>2.95</u> | — | |
| FF | 0.040 | 0.60 | 1.75 | 0.017 | 0.002 | 0.043 | 0.10 | 0.003 | — | — | 0.40 | — | 0.003 | | — | <u>3.35</u> | |

Underlined: Outside the scope of the invention.

The hot-rolled steel strip was pickled, then annealed in a hydrogen-nitrogen mixed gas at 550 to 730° C. in a continuous hot-dipping line and cooled to about 420° C. at a mean cooling rate of 5° C./sec thereby giving a base steel sheet (steel sheet to be plated). Subsequently, while the surface thereof was kept away from air, the steel sheet was dipped in a Zn—Al—Mg-based hot-dipping bath having the composition shown below and then drawn up, and thereafter according to a gas wiping method, the plating weight was controlled to be about 90 g/m² per one surface, thereby giving a Zn—Al—Mg-based alloy hot-dip plated steel sheet. The plating bath temperature was about 410° C. The annealing temperature for each steel is shown in Table 4.

[Plating Bath Composition (Mass %)]

Al: 6.0%, Mg: 3.0%, Ti: 0.002%, B: 0.0005%, Si: 0.01%, Fe: 0.1%, Zn: balance.

[Mean Particle Diameter of Precipitates]

A thin film formed from the collected steel sheet sample hot-dip-coated with a Zn—Al—Mg-based coating was observed with a transmission electron microscope (TEM). The particle diameter (major axis) of each precipitate particle in a predetermined region containing at least 30 Ti-containing precipitates was measured, and the found data were averaged to give a mean particle diameter of the Ti-containing precipitates.

[Tensile Characteristics]

A test piece was sampled from the steel sheet in such a manner that the lengthwise direction thereof could be perpendicular to the rolling direction of the base steel sheet. Thus sampled, the JIS No. 5 test piece was tested according to JISZ2241 to determine the tensile strength TS and the total elongation T.EL thereof.

[Hole Expanding Workability]

A sample of 90×90 mm was collected from the Zn—Al—Mg-based alloy hot-dip plated steel sheet to prepare a base sheet (blank) for a hole expanding test. Using a punch and a die, a punched hole was formed in a center of the base sheet. The diameter $D_0$ of the punch was 10.0 mm, and the dice was so selected that the clearance thereof could be 12% of the plate thickness. Into the just-punched hole, a punch having an apex angle of 60° was inserted from the side opposite to the burr, to thereby enlarge the original hole. In this case, the punch moving speed was 10 mm/min. At the time when the hole of the steel sheet expanded and the cracking run through the sheet in the thickness direction, the punch was stopped, and the inner diameter $D_h$ of the hole was measured. A hole expanding ratio λ defined by $(D_h-D_0)/D_h \times 100(\%)$ was computed. Samples of which λ is at least 60% are evaluated to have good burring workability on the practicable level in many applications for welded structural members; however, a severer standard is employed here and those of which λ is at least 70% are judged as acceptable.

[Evaluation of Liquid Metal Embrittlement Cracking Resistance]

The liquid metal embrittlement cracking resistance was evaluated in a welding test according to the process mentioned below.

A sample of 100 mm×75 mm was cut out of the Zn—Al—Mg-based alloy hot-dip plated steel sheet to prepare a test piece for evaluation of the maximum depth of cracking caused by liquid metal embrittlement. In the welding test, a boss-welded material shown in FIG. 1 was formed by "boss welding", and the cross section of the welded part was checked for cracking. Concretely, a boss (projection) 1 of a steel rod having a diameter of 20 mm and a length of 25 mm (SS400 defined in JIS) was kept standing vertically in the center part of the surface of the test piece 3, and the boss 1 was joined by arc-welding to the test piece 3. As the welding wire, used was YGW12. After the welding bead 6 had run once around the periphery of the boss from the welding start point and had passed through the welding start point, the welding was continued further a little, and after thus having passed through the welding start point and to form the welding bead overlapping part 8, the welding was stopped. The welding condition was: 190 A, 23 V, welding speed of 0.3 m/min, shielding gas of Ar-20 vol % $CO_2$, and shielding gas flow rate of 20 L/min.

Figure 2:
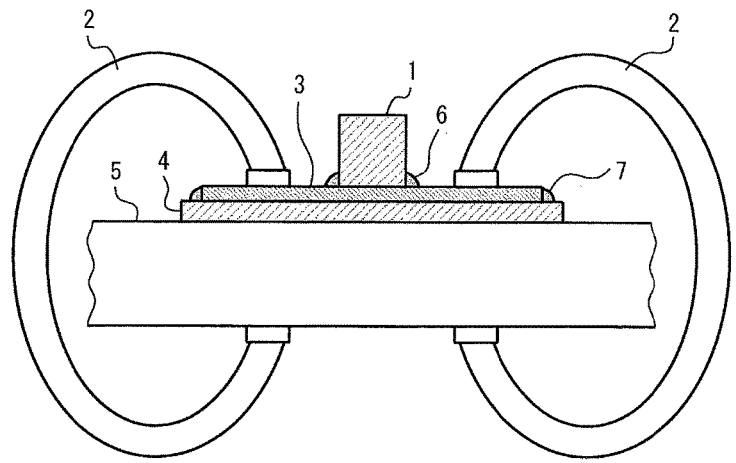
FIG. 2 A cross-sectional view explaining a process of forming a boss-welding test piece.

In welding, the test piece 3 was previously joined to a constrained plate 4, as shown in FIG. 2. Concretely, a constrained plate 4 of 120 mm×95 mm×4 mm thickness (SS400 defined in JIS) was first prepared, then the test piece 3 was put in the center part of the surface of the plate, and thereafter the entire periphery of the test piece 3 was welded to the constrained plate 4 to thereby construct a joined assembly. The joined assembly (test piece 3 and constrained plate 4) was fixed on a horizontal lab bench 5 with a clamp 2, and in that condition, the boss welding was carried out.

After the boss-welding, the joined assembly of boss 1/test piece 3/constrained plate 4 was cut along the cutting plane 9 running along the center axis of the boss 1 and running through the bead overlapping part 8, and the cut surface 9 was observed with a microscope to determine the maximum depth of the cracking observed in the test piece 3, and this is referred to as the maximum base metal cracking depth. This corresponds to the liquid metal embrittlement cracking. The samples in which the maximum base metal cracking depth was at most 0.1 mm were evaluated as acceptable, and those in which the maximum base metal cracking depth was more than 0.1 mm were unacceptable.

[Evaluation of Corrosion Resistance in Welded Part]

Figure 3:
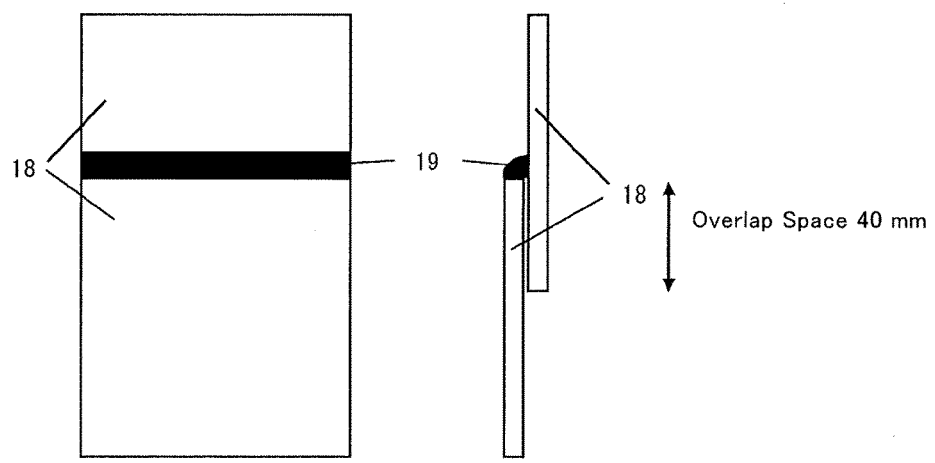
FIG. 3 A schematic view of an overlapping fillet weld joint.
Figure 4:
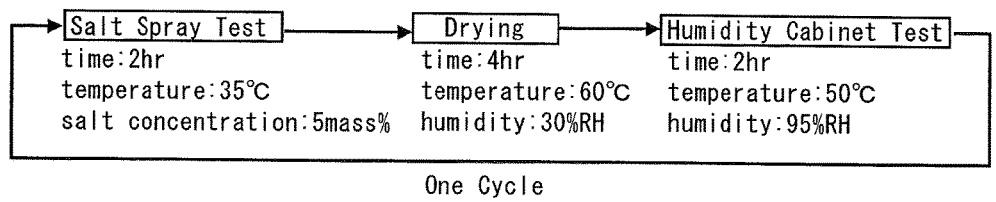
FIG. 4 Composite cycle corrosion test condition.

A sample of 100 mm×100 mm was collected from the Zn—Al—Mg-based alloy hot-dip plated steel sheet, and two samples of the same type were joined under the welding condition mentioned below, in a mode of overlapping fillet arc-welding schematically shown in FIG. 3. Subsequently, under the condition shown in Table 2, the sample was processed for surface conditioning and phosphate treatment, and then processed for cationic electrodeposition coating under the condition shown in Table 3. For simulating the fatigue thereof under vibration, the cationic electrodeposition-coated sample was tested in a fatigue test in which the test condition was: the stress in the direction vertical to the welding direction of 50 $N/mm^2$, and the number of test cycles of $1\times10^5$. Subsequently, the sample was tested in a cyclic corrosion test (CCT) under the condition shown in FIG. 4, in which each tested sample was checked for the presence or absence of red rust formation after CCT 250 cycles. The samples with no red rust formation in the welded part were judged as good (O), and the others were judged as not good (x).

The welding condition is as follows:
Welding current: 150 A
Arc voltage: 20 V
Welding speed: 0.4 m/min
Welding wire: YGW14
Shielding gas: Ar-20 vol % $CO_2$, flow rate 20 L/min
The test results are shown in Table 4.

TABLE 2

Condition for Surface Conditioning and Phosphate Treatment

| | | |
|---|---|---|
| Surface Conditioning | Processing Liquid | Nihon Parkerizing's Prepalene X |
| | Processing Liquid Temperature | 40° C. |
| | Dipping Time | 30 sec |
| Phosphate Treatment | Processing Liquid | Nihon Parkerizing's Parbond L15C |
| | Processing Liquid Temperature | 40° C. |
| | Dipping Time | 2 min |
| | Amount of Coating | 2 $g/m^2$ |

TABLE 3

Condition for Cationic Electrodeposition Coating

| | |
|---|---|
| Coating Material | Epoxy resin (Nippon Paint's Power-Top U Excel 250) |
| Baking Temperature | 140° C. |
| Baking Time | 20 min |
| Thickness of Coating | 20 μm |

TABLE 4

| | | Production Condition | | | | | | | |
|---|---|---|---|---|---|---|---|---|---|
| | | Coiling Temperature in Hot Rolling (° C.) | Annealing Temperature in Continuous Hot-Dip-Coating Line (° C.) | Mean Particle Diameter of Ti-Containing Precipitates (nm) | Tensile Characteristics | | Hole Expanding Ratio λ (%) | Maximum Base Metal Cracking Depth (mm) | Evaluation of Corrosion Resistance in Welded Part | Classification |
| No | Steel | | | | TS (MPa) | T.EL (%) | | | | |
| 1 | A | 590 | 630 | 13 | 783 | 21.0 | 106 | 0.05 | o | Invention Sample |
| 2 | B | 580 | 620 | 12 | 799 | 20.7 | 104 | 0.08 | o | |
| 3 | C | 610 | 630 | 9 | 823 | 21.0 | 101 | 0 | o | |
| 4 | D | 670 | 610 | 17 | 811 | 20.3 | 102 | 0.08 | o | |
| 5 | E | 630 | 630 | 8 | 855 | 19.0 | 97 | 0.04 | o | |
| 6 | F | 570 | 590 | 12 | 882 | 18.0 | 94 | 0.04 | o | |
| 7 | G | 590 | 620 | 8 | 870 | 19.0 | 95 | 0.03 | o | |
| 8 | H | 620 | 610 | 11 | 912 | 18.0 | 91 | 0 | o | |
| 9 | I | 640 | 630 | 18 | 632 | 27.3 | 131 | 0.02 | o | |
| 10 | J | 600 | 610 | 13 | 1011 | 16.3 | 82 | 0.06 | o | |

TABLE 4-continued

| | | Production Condition | | | | | | | |
|---|---|---|---|---|---|---|---|---|---|
| | | Coiling Temperature in Hot Rolling | Annealing Temperature in Continuous Hot-Dip-Coating Line | Mean Particle Diameter of Ti-Containing Precipitates | Tensile Characteristics | | Hole Expanding Ratio λ | Maximum Base Metal Cracking Depth | Evaluation of Corrosion Resistance in Welded |
| No | Steel | (° C.) | (° C.) | (nm) | TS (MPa) | T.EL (%) | (%) | (mm) | Part | Classification |
| 11 | K | 630 | 640 | 8 | 925 | 17.1 | 86 | 0 | ○ | |
| 12 | L | 580 | 620 | 6 | 912 | 18.1 | 91 | 0.02 | ○ | |
| 13 | M | 570 | 670 | 12 | 910 | 17.7 | 91 | 0.03 | ○ | |
| 14 | N | 600 | 580 | 15 | 930 | 16.9 | 89 | 0 | ○ | |
| 15 | O | 610 | 640 | 11 | 850 | 18.8 | 93 | 0 | ○ | |
| 16 | P | 600 | 600 | 9 | 850 | 19.0 | 98 | 0 | ○ | |
| 17 | Q | 590 | 630 | 7 | 782 | 21.0 | 110 | 0.04 | ○ | |
| 18 | R | 610 | 580 | 8 | 788 | 20.5 | 98 | 0.02 | ○ | |
| 19 | S | 620 | 590 | 10 | 799 | 19.7 | 96 | 0.07 | ○ | |
| 20 | T | 580 | 620 | 9 | 785 | 19.9 | 94 | 0.05 | ○ | |
| 21 | U | 600 | 620 | 7 | 830 | 20.0 | 98 | 0.04 | ○ | |
| 22 | <u>V</u> | 580 | 600 | <u>35</u> | 750 | 14.0 | <u>65</u> | 0.05 | ○ | Comparative Sample |
| 23 | <u>W</u> | 640 | 600 | <u>22</u> | <u>548</u> | 25.0 | 192 | 0.05 | ○ | |
| 24 | <u>X</u> | 600 | 620 | 15 | 798 | 18.0 | <u>69</u> | 0.04 | ○ | |
| 25 | <u>Y</u> | 570 | 590 | 9 | 802 | 22.0 | 122 | <u>2.6</u> | ○ | |
| 26 | <u>Z</u> | 590 | 600 | 11 | 988 | 17.0 | 93 | <u>2.0</u> | ○ | |
| 27 | <u>AA</u> | 580 | 590 | 14 | 935 | 14.3 | 84 | <u>0.6</u> | ○ | |
| 28 | <u>BB</u> | 620 | 630 | 18 | 770 | 14.0 | <u>65</u> | <u>0.5</u> | ○ | |
| 29 | <u>CC</u> | 600 | 640 | 16 | 966 | 17.0 | 75 | <u>0.6</u> | ○ | |
| 30 | <u>DD</u> | 610 | 640 | 19 | 951 | 14.0 | <u>55</u> | <u>2.3</u> | ○ | |
| 31 | <u>EE</u> | 590 | 630 | 13 | 783 | 21.0 | 106 | <u>0.45</u> | ○ | |
| 32 | <u>FF</u> | 590 | 620 | 8 | 870 | 19.0 | 95 | <u>0.53</u> | ○ | |
| 33 | A | <u>530</u> | 600 | 15 | 750 | 16.0 | <u>68</u> | 0.05 | ○ | |
| 34 | A | <u>700</u> | 630 | <u>45</u> | 733 | 16.3 | <u>59</u> | 0.04 | ○ | |
| 35 | A | 580 | <u>730</u> | <u>48</u> | 752 | 15.7 | <u>55</u> | 0 | ○ | |

Underlined: Outside the scope of the invention.
Double-underlined: Characteristics insufficient.

The samples of the invention all have a hole-expanding ratio λ of at least 70% and a maximum base metal cracking depth of at most 0.1 mm, and have both excellent burring workability and excellent liquid metal embrittlement cracking resistance. In addition, the samples have good corrosion resistance in the welded part, having a high tensile strength TS of at least 590 MPa, and the plated steel sheet of the invention is suitable as a material for automobile underbody members.

As opposed to these, No. 22 contains a large amount of Ti and the particle diameter of the precipitates therein is large, and therefore the hole-expanding workability of the sample is poor. In No. 23, the amount of C is small, and therefore the sample does not have a sufficient tensile strength. In No. 24, the amount of P is large, and the hole-expanding workability of the sample is poor. In No. 25, the amount of B is small, and therefore the maximum base metal cracking depth of the sample is large. Nos. 26, 27, 29, 31 and 32 have a large H1 value or H2 value, and therefore the maximum base metal cracking depth thereof is large. No. 28 has a large C content and a large H1 value, and No. 30 has a large Mn content and a large H1 value, and therefore both these samples have poor hole-expanding workability and have a large maximum base metal cracking depth. Regarding No. 33, the coiling temperature in hot rolling is low and therefore a bainite phase formed, and the hole-expanding workability of the sample is poor. Regarding No. 34, the coiling temperature in hot rolling is high, and regarding No. 35, the annealing temperature in the continuous hot-dipping line is high; and therefore in both these, the particle diameter of the Ti-containing precipitates is large and the hole-expanding workability of these samples is poor.

Figure 5:
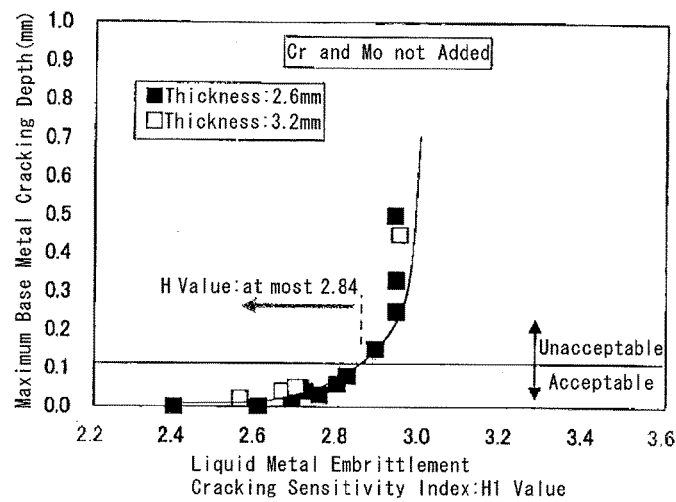
FIG. 5 Graph showing the relationship between liquid metal embrittlement cracking sensitivity index H1 and maximum base metal cracking depth.

FIG. 5 shows the relationship between the liquid metal embrittlement cracking sensitivity index H1 and the maximum base metal cracking depth.

Figure 6:
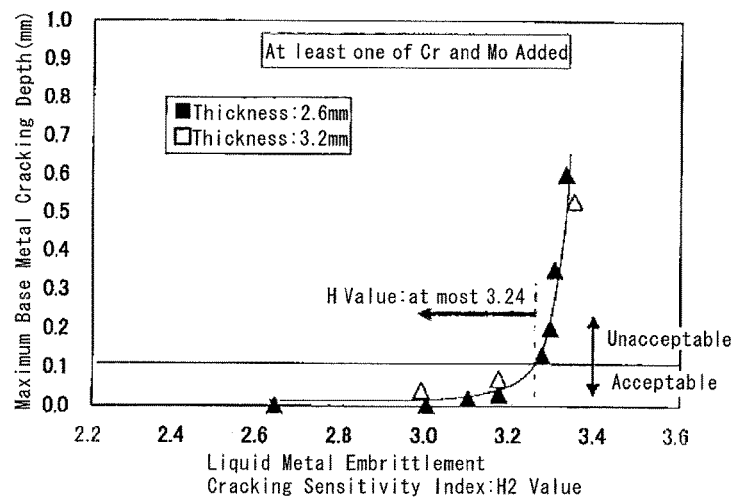
FIG. 6 Graph showing the relationship between liquid metal embrittlement cracking sensitivity index H2 and maximum base metal cracking depth.

FIG. 6 shows the relationship between the liquid metal embrittlement cracking sensitivity index H2 and the maximum base metal cracking depth.

Example 2

The steel having the composition shown in Table 5 was produced by melting, and processed under the same condition as in Example 1 to give a Zn—Al—Mg-based alloy hot-dip plated steel sheet. The thickness of the hot-rolled steel strip, and the above-mentioned H3 value thereof are shown in Table 5, and the coiling temperature is in Table 6.

TABLE 5

| | Chemical Composition (mass %) | | | | | | | | | | | | | Thickness | H3 | |
|---|---|---|---|---|---|---|---|---|---|---|---|---|---|---|---|---|
| Steel | C | Si | Mn | P | S | Al | Ti | B | Nb | V | Cr | Mo | N | (mm) | Value | Classification |
| a | 0.038 | 0.58 | 1.05 | 0.019 | 0.003 | 0.044 | 0.10 | 0.003 | — | | — | | 0.003 | 2.6 | 2.15 | Invention Sample |
| b | <u>0.025</u> | 0.47 | 1.42 | 0.015 | 0.003 | 0.040 | 0.11 | 0.003 | — | | — | | 0.002 | | 2.35 | |
| c | 0.081 | 0.38 | 0.88 | 0.018 | 0.008 | 0.036 | 0.17 | 0.004 | — | | — | | 0.004 | | 2.20 | |

TABLE 5-continued

| Steel | C | Si | Mn | P | S | Al | Ti | B | Nb | V | Cr | Mo | N | Thickness (mm) | H3 Value | Classification |
|---|---|---|---|---|---|---|---|---|---|---|---|---|---|---|---|---|
| d | 0.022 | 0.08 | 1.44 | 0.023 | 0.003 | 0.033 | 0.06 | 0.005 | — | — | — | — | 0.004 | | 2.27 | |
| e | 0.041 | 0.91 | 1.42 | 0.015 | 0.002 | 0.044 | 0.13 | 0.03 | — | | — | — | 0.003 | | 2.52 | |
| f | 0.042 | 0.53 | 1.12 | 0.019 | 0.002 | 0.043 | 0.08 | 0.004 | 0.02 | | | — | 0.003 | | 2.22 | |
| g | 0.045 | 0.60 | 0.98 | 0.017 | 0.002 | 0.043 | 0.10 | 0.003 | — | | 0.40 | — | 0.003 | | 2.10 | |
| h | 0.022 | 0.30 | 1.13 | 0.018 | 0.003 | 0.033 | 0.06 | 0.005 | — | | — | 0.20 | 0.003 | | 1.93 | |
| i | 0.035 | 0.48 | 1.99 | 0.022 | 0.008 | 0.068 | 0.09 | 0.002 | — | | — | — | 0.004 | | 2.84 | |
| j | 0.050 | 0.70 | 1.75 | 0.022 | 0.008 | 0.036 | 0.19 | 0.004 | — | | — | — | 0.004 | | 2.78 | |
| k | 0.077 | 0.28 | 1.23 | 0.023 | 0.002 | 0.033 | 0.11 | 0.003 | 0.08 | | — | — | 0.003 | | 2.43 | |
| l | 0.035 | 0.45 | 1.28 | 0.016 | 0.002 | 0.040 | 0.10 | 0.003 | — | | 0.81 | — | 0.003 | | 2.47 | |
| m | 0.040 | 0.65 | 1.18 | 0.020 | 0.003 | 0.045 | 0.10 | 0.003 | — | | — | — | 0.002 | | 2.28 | |
| n | 0.041 | 0.39 | 1.39 | 0.017 | 0.003 | 0.038 | 0.08 | 0.003 | — | | 0.60 | — | 0.002 | | 2.45 | |
| o | 0.038 | 0.28 | 1.42 | 0.017 | 0.002 | 0.033 | 0.09 | 0.003 | — | | 0.22 | 0.10 | 0.002 | | 2.29 | |
| p | 0.041 | 0.53 | 1.22 | 0.020 | 0.003 | 0.045 | 0.05 | 0.003 | — | 0.09 | — | — | 0.003 | | 2.29 | |
| q | 0.055 | 0.59 | 0.62 | 0.013 | 0.003 | 0.038 | 0.14 | 0.003 | — | | — | — | 0.003 | 3.2 | 2.15 | |
| r | 0.035 | 0.42 | 0.81 | 0.018 | 0.005 | 0.044 | 0.10 | 0.004 | 0.04 | | — | — | 0.002 | | 2.16 | |
| s | 0.042 | 0.60 | 1.05 | 0.017 | 0.002 | 0.043 | 0.09 | 0.003 | — | | 0.41 | — | 0.003 | | 2.38 | |
| t | 0.038 | 0.65 | 1.60 | 0.016 | 0.003 | 0.033 | 0.08 | 0.003 | 0.03 | | — | — | 0.003 | | 2.83 | |
| u | 0.053 | 0.35 | 1.14 | 0.022 | 0.002 | 0.041 | 0.04 | 0.003 | — | | — | 0.61 | 0.003 | | 2.45 | |
| v | 0.063 | 0.50 | 1.41 | 0.017 | 0.003 | 0.032 | 0.25 | 0.002 | — | | — | — | 0.004 | 2.6 | 2.54 | Comparative |
| w | 0.003 | 0.38 | 1.89 | 0.017 | 0.003 | 0.044 | 0.08 | 0.002 | — | | — | — | 0.004 | | 2.58 | Sample |
| x | 0.029 | 0.41 | 1.65 | 0.055 | 0.003 | 0.046 | 0.09 | 0.003 | — | | — | — | 0.004 | | 2.54 | |
| y | 0.044 | 0.58 | 1.60 | 0.020 | 0.003 | 0.055 | 0.12 | 0.0003 | — | | — | — | 0.003 | | 2.61 | |
| z | 0.082 | 0.60 | 2.07 | 0.022 | 0.002 | 0.044 | 0.06 | 0.003 | — | | — | — | 0.004 | | 3.16 | |
| aa | 0.044 | 0.70 | 1.98 | 0.022 | 0.002 | 0.044 | 0.06 | 0.003 | — | — | 0.60 | — | 0.004 | | 2.98 | |
| bb | 0.122 | 0.33 | 1.58 | 0.016 | 0.003 | 0.038 | 0.05 | 0.002 | — | — | — | — | 0.004 | | 2.93 | |
| cc | 0.058 | 0.70 | 2.07 | 0.022 | 0.002 | 0.044 | 0.08 | 0.003 | — | — | 2.24 | 0.07 | 0.004 | | 2.97 | |
| dd | 0.035 | 0.15 | 2.57 | 0.022 | 0.002 | 0.044 | 0.10 | 0.003 | — | — | — | — | 0.004 | | 3.22 | |
| ee | 0.043 | 0.63 | 1.77 | 0.017 | 0.002 | 0.043 | 0.11 | 0.003 | — | — | — | — | 0.003 | 3.2 | 2.98 | |
| ff | 0.039 | 0.56 | 1.83 | 0.017 | 0.002 | 0.043 | 0.10 | 0.003 | — | — | 0.40 | — | 0.003 | | 2.95 | |

Underlined: Outside the scope of the invention.
Steels b and d are also outside the scope of the invention.

In the same manner as in Example 1, those Zn—Al—Mg-based alloy hot-dip plated steel sheet were tested in various test methods, and the characteristics thereof were evaluated. The results are shown in Table 6.

TABLE 6

| | | Production Condition | | Mean Particle Diameter of Ti-Containing Precipitates (nm) | Tensile Characteristics | | Hole Expanding Ratio λ (%) | Maximum Base Metal Cracking Depth (mm) | Evaluation of Corrosion Resistance in Welded Part | Classification |
|---|---|---|---|---|---|---|---|---|---|---|
| No. | Steel | Coiling in Hot Rolling (°C.) | Annealing Temperature in Continuous Hot-Dip-Coating Line (°C.) | | TS (MPa) | T.EL (%) | | | | |
| 51 | a | 590 | 630 | 13 | 803 | 18.2 | 106 | 0.05 | ○ | Invention |
| 52 | b | 580 | 620 | 12 | 781 | 19.8 | 104 | 0.05 | ○ | Sample |
| 53 | c | 610 | 630 | 9 | 892 | 16.4 | 101 | 0 | ○ | |
| 54 | d | 670 | 610 | 17 | 640 | 22.2 | 142 | 0.05 | ○ | |
| 55 | e | 630 | 630 | 8 | 881 | 17.5 | 92 | 0.04 | ○ | |
| 56 | f | 570 | 590 | 12 | 800 | 18.0 | 99 | 0.04 | ○ | |
| 57 | g | 590 | 620 | 8 | 816 | 19.0 | 106 | 0.03 | ○ | |
| 58 | h | 620 | 610 | 11 | 685 | 21.1 | 122 | 0 | ○ | |
| 59 | i | 640 | 630 | 18 | 821 | 18.1 | 100 | 0.07 | ○ | |
| 60 | j | 600 | 610 | 13 | 931 | 16.1 | 75 | 0.06 | ○ | |
| 61 | k | 630 | 640 | 8 | 925 | 17.1 | 86 | 0 | ○ | |
| 62 | l | 580 | 620 | 6 | 865 | 16.2 | 91 | 0.02 | ○ | |
| 63 | m | 570 | 670 | 12 | 811 | 17.7 | 118 | 0.03 | ○ | |
| 64 | n | 600 | 580 | 15 | 832 | 18.1 | 98 | 0 | ○ | |
| 65 | o | 610 | 640 | 11 | 881 | 16.4 | 89 | 0 | ○ | |
| 66 | p | 600 | 600 | 9 | 850 | 19.0 | 98 | 0 | ○ | |
| 67 | q | 590 | 630 | 7 | 912 | 17.0 | 88 | 0.04 | ○ | |
| 68 | r | 610 | 580 | 8 | 878 | 18.2 | 98 | 0.02 | ○ | |
| 69 | s | 620 | 590 | 10 | 799 | 19.7 | 96 | 0.04 | ○ | |
| 70 | t | 580 | 620 | 9 | 785 | 19.9 | 94 | 0.05 | ○ | |
| 71 | u | 600 | 620 | 7 | 712 | 20.0 | 111 | 0.04 | ○ | |
| 72 | v | 580 | 600 | 35 | 772 | 14.0 | 51 | 0.05 | ○ | Comparative |
| 73 | w | 640 | 600 | 22 | 548 | 25.0 | 155 | 0.05 | ○ | Sample |
| 74 | x | 600 | 620 | 15 | 798 | 18.0 | 54 | 0.04 | ○ | |
| 75 | y | 570 | 590 | 9 | 802 | 22.0 | 122 | 2.60 | ○ | |
| 76 | z | 590 | 600 | 11 | 988 | 16.1 | 93 | 2.00 | ○ | |

TABLE 6-continued

| | | Production Condition | | Tensile Characteristics | | Hole Expanding | Maximum Base Metal Cracking | Evaluation of Corrosion | |
|---|---|---|---|---|---|---|---|---|---|
| No. | Steel | Coiling in Hot Rolling (° C.) | Annealing Temperature in Continuous Hot-Dip-Coating Line (° C.) | Mean Particle Diameter of Ti-Containing Precipitates (nm) | TS (MPa) | T.EL (%) | Ratio λ (%) | Depth (mm) | Resistance in Welded Part | Classification |
| 77 | aa | 580 | 590 | 14 | 881 | 17.2 | 84 | 0.60 | ○ | |
| 78 | bb | 620 | 630 | 18 | 770 | 14.0 | 53 | 0.18 | ○ | |
| 79 | cc | 600 | 640 | 16 | 879 | 17.0 | 75 | 0.33 | ○ | |
| 80 | dd | 610 | 640 | 19 | 911 | 14.0 | 40 | 2.30 | ○ | |
| 81 | ee | 590 | 630 | 13 | 811 | 19.0 | 106 | 0.45 | ○ | |
| 82 | ff | 590 | 620 | 8 | 870 | 18.0 | 95 | 0.38 | ○ | |
| 83 | a | 530 | 600 | 15 | 813 | 16.0 | 54 | 0.05 | ○ | |
| 84 | a | 700 | 630 | 45 | 772 | 16.3 | 49 | 0.04 | ○ | |
| 85 | a | 580 | 730 | 48 | 752 | 15.7 | 44 | 0 | ○ | |

Underlined: Outside the scope of the invention.
Double-underlined: Characteristics insufficient.

The samples of the invention all have a hole-expanding ratio λ of at least 70% and a maximum base metal cracking depth of at most 0.1 mm, and have both excellent burring workability and excellent liquid metal embrittlement cracking resistance. In addition, the samples have good corrosion resistance in the welded part, having a high tensile strength TS of at least 590 MPa, and the plated steel sheet of the invention is suitable as a material for various types of welded structural members such as typically automobile underbody members.

As opposed to these, No. 72 contains a large amount of Ti and the particle diameter of the precipitates therein is large, and therefore the hole-expanding workability of the sample is poor. In No. 73, the amount of C is small, and therefore the sample does not have a sufficient tensile strength. In No. 74, the amount of P is large, and the hole-expanding workability of the sample is poor. In No. 75, the amount of B is small, and therefore the maximum base metal cracking depth of the sample is large. Nos. 76, 77, 79, 81 and 82 have a large H3 value, and therefore the maximum base metal cracking depth thereof is large. No. 78 has a large C content and a large H3 value, and No. 80 has a large Mn content and a large H3 value, and therefore both these samples have poor hole-expanding workability and have a large maximum base metal cracking depth. Regarding No. 83, the coiling temperature in hot rolling is low and therefore a bainite phase formed, and the hole-expanding workability of the sample is poor. Regarding No. 84, the coiling temperature in hot rolling is high, and regarding No. 85, the annealing temperature in the continuous hot-dipping line is high; and therefore in both these, the particle diameter of the Ti-containing precipitates is large and the hole-expanding workability of these samples is poor.

Figure 7:
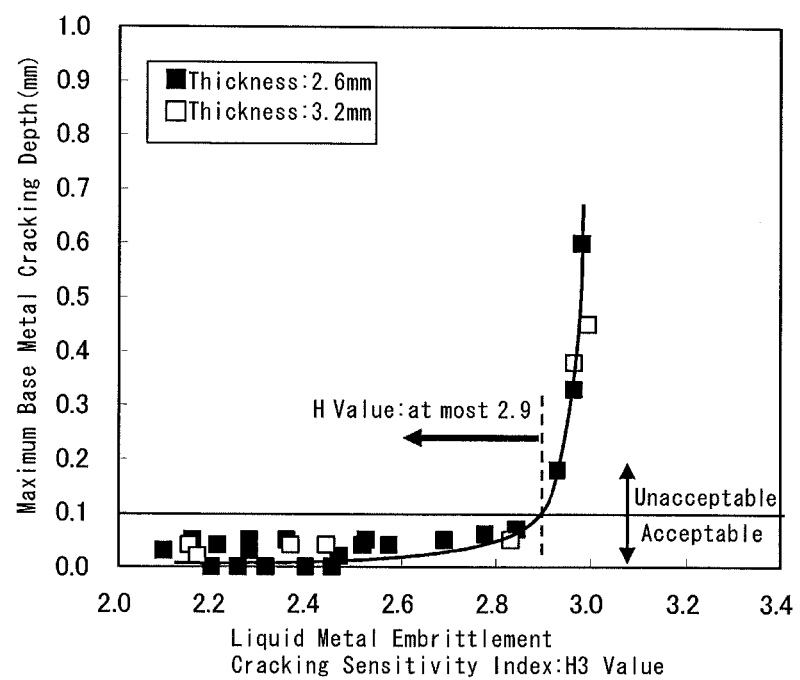
FIG. 7 Graph showing the relationship between liquid metal embrittlement cracking sensitivity index H3 and maximum base metal cracking depth.

FIG. 7 shows the relationship between the liquid metal embrittlement cracking sensitivity index H3 and the maximum base metal cracking depth. It is known that, irrespective of the presence or absence of the optional elements Cr and Mo therein, the liquid metal embrittlement cracking sensitivity of the samples satisfying H3≤2.90 can be evaluated with accuracy.

DESCRIPTION OF REFERENCE NUMERALS AND SIGNS

1 Boss
2 Clamp
3 Test Piece
4 Constrained Plate
5 Lab Bench
6 Weld Bead
7 Weld Bead in Entire Peripheral Welded Part in Test Piece
8 Overlapping Part of Weld Bead
9 Cutting Plane
18 Steel Sheet Sample Hot-Dip-Coated with Zn—Al—Mg-Based Coating
19 Weld Metal

The invention claimed is:

1. A plated steel sheet for use in forming automobile underbody members comprising a base steel and a Zn—Al—Mg-based alloy layer formed by hot-dipping on the surface of the base steel sheet, wherein the base steel sheet has a chemical composition consisting of, in terms of % by mass, C of from 0.035 to 0.100%, Si of at most 1.00%, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.100%, and a balance of Fe and inevitable impurities, and has a ferrite single phase metallographic structure in which Ti-containing precipitates having a mean particle diameter of at most 20 nm are dispersed, and wherein the liquid metal embrittlement cracking sensitivity index HI value of the base steel sheet represented by the following formula (1) and indicating the relationship between the contents of the steel components and the thickness t (mm) of the steel sheet is at most 2.84:

$$HI \text{ Value} = C/0.2 + Si/5.0 + Mn/1.3 + 0.4t \quad (1),$$

in the site of the element symbol in the formula (1), the content of the corresponding element (% by mass) in the base steel sheet is introduced.

2. The Zn—Al—Mg-based alloy plated steel sheet according to claim 1, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

3. The plated steel sheet of claim 1, wherein the base steel sheet is a hot-rolled sheet.

4. A plated steel sheet for use in forming automobile underbody members comprising a base steel and a Zn—

Al—Mg-based alloy layer formed by hot-dipping on the surface of the base steel sheet, wherein the base steel sheet has a chemical composition consisting of, in terms of % by mass, C of from 0.035 to 0.100%, Si of at most 1.00%, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.100%, Cr at most 1.00%, and a balance of Fe and inevitable impurities, and has a ferrite single phase metallographic structure in which Ti-containing precipitates having a mean particle diameter of at most 20 nm are dispersed, and wherein the liquid metal embrittlement cracking sensitivity index H2 value of the base steel sheet represented by the following formula (2) and indicating the relationship between the contents of the steel components and the thickness t (mm) of the steel sheet is at most 3.24:

$$H2\ Value = C/0.2 + Si/5.0 + Mn/1.3 + Cr/1.0 + 0.4t \qquad (2)$$

in the site of the element symbol in the formula (2), the content of the corresponding element (% by mass) in the base steel sheet is introduced.

5. The plated steel sheet of claim 4, wherein the base steel sheet is a hot-rolled sheet.

6. The Zn—Al—Mg-based alloy plated steel sheet according to claim 2, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

7. A plated steel sheet for use in forming automobile underbody members having a Zn—Al—Mg-based alloy layer formed by hot-dipping on a surface of a base steel sheet, wherein the base steel sheet has a chemical composition consisting of, in terms of % by mass, C of from 0.035 to 0.100%, Si of at most 1.00%, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.100%, and further consisting of at least one of Nb of at most 0.10% and V of at most 0.10% and a balance of Fe and inevitable impurities, and has a ferrite single phase metallographic structure in which Ti-containing precipitates having a mean particle diameter of at most 20 nm are dispersed, and wherein the liquid metal embrittlement cracking sensitivity index HI value of the base steel sheet represented by the following formula (1) and indicating the relationship between the contents of the steel components and the thickness t (mm) of the steel sheet is at most 2.84:

$$HI\ Value = C/0.2 + Si/5.0 + Mn/1.3 + 0.4t \qquad (1)$$

in the site of the element symbol in the formula (1), the content of the corresponding element (% by mass) in the base steel sheet is introduced.

8. The plated steel sheet of claim 7, wherein the base steel sheet is a hot-rolled sheet.

9. The Zn—Al—Mg-based alloy plated steel sheet according to claim 7, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

10. A plated steel sheet for use in forming welded structural members comprising a base steel and a Zn—Al—Mg-based alloy layer formed by hot-dipping on the surface of the base steel sheet, wherein the base steel sheet has a chemical composition consisting of, in terms of % by mass, C of from 0.035 to 0.100%, Si of from 0.01 to 1.00%, Mn of from 0.50 to 2.50%, P of from 0.005 to 0.050%, S of from 0.001 to 0.020%, N of from 0.001 to 0.005%, Ti of from 0.02 to 0.20%, B of from 0.0005 to 0.0100%, Al of from 0.005 to 0.100%, Cr of from 0 to 1.00%, Nb of from 0 to 0.10%, V of from 0 to 0.10%, and a balance of Fe and inevitable impurities, and has a metallographic structure of such that Ti-containing precipitates having a mean particle diameter of at most 20 nm are dispersed in a matrix formed of a ferrite single phase therein, and wherein the liquid metal embrittlement cracking sensitivity index H3 value of the base steel sheet represented by the following formula (3) and indicating the relationship between the contents of the steel components and the thickness t (mm) of the steel sheet is at most 2.90:

$$H3\ Value = C/0.2 + Si/5.0 + Mn/1.3 + Cr/1.0 + [[Mo/1.2]] + 0.4t - 0.7Cr^{1/2} \qquad (3)$$

in the site of the element symbol in the formula (3), the content of the corresponding element (% by mass) in the base steel sheet is introduced.

11. The plated steel sheet of claim 10, wherein the base steel sheet is a hot-rolled sheet.

12. The Zn—Al—Mg-based alloy plated steel sheet according to claim 10, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

13. A method for producing a plated steel sheet for use in forming automobile underbody members having a Zn—Al—Mg-based alloy layer formed by hot-dipping on the surface of the base steel sheet; the method comprising a step of sequentially processing a steel sheet that consists of, in terms of % by mass, C of from 0.035 to 0.100%, Si of at most 1.00%, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.100%, and a balance of Fe and inevitable impurities, for hot rolling, pickling, and annealing and Zn—Al—Mg-based hot-dipping in a continuous hot-dipping line to thereby produce a plated steel sheet having, on the surface of the base steel sheet, a Zn—Al—Mg-based plating layer formed thereon, wherein:

the steel sheet is hot-rolled to have a thickness t (mm), with which the liquid metal embrittlement cracking sensitivity index HI value thereof represented by the following formula (1) is at most 2.84, the coiling temperature is from 550 to 680° C., and the annealing temperature in the continuous hot-dipping line is from 500 to 700° C.:

$$HI\ Value = C/0.2 + Si/5.0 + Mn/1.3 + 0.4t \qquad (1),$$

in the site of the element symbol in the formula (1), the content of the corresponding element (% by mass) in the base steel sheet is introduced.

14. The method for producing a Zn—Al—Mg-based alloy plated steel sheet according to claim 13, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, Si of from 0 to 2.0%, Fe of from 0 to 2.0%, and a balance of Zn and inevitable impurities.

15. A method for producing a plated steel sheet for use in forming automobile underbody members having a Zn—Al—Mg-based alloy layer formed by hot-dipping on the surface of the base steel sheet; the method comprising a step of sequentially processing a steel sheet that comprises, in terms of % by mass, C of from 0.035 to 0.100%, Si of at most 1.00° k, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.001%, Cr of at most 1.00%, and a balance of Fe and inevitable impurities, for hot rolling, pickling, and annealing and Zn—Al—Mg-based hot-dipping in a continuous hot-dipping line to thereby produce a plated steel sheet having, on the surface of the base steel sheet, a Zn—Al—Mg-based plating layer formed thereon, wherein:

the steel sheet is hot-rolled to have a thickness t (mm), with which the liquid metal embrittlement cracking sensitivity index H2 value thereof represented by the following formula (2) is at most 3.24, the coiling temperature is from 550 to 680° C., and the annealing temperature in the continuous hot-dipping line is from 500 to 700° C.:

$$H2\ \text{Value} = C/0.2 + Si/5.0 + Mn/1.3 + Cr/1.0 + [[Mo/1.2]] + 0.4t \quad (2)$$

in the site of the element symbol in the formula (2), the content of the corresponding element (% by mass) in the base steel sheet is introduced.

16. The method for producing a Zn—Al—Mg-based alloy plated steel sheet according to claim 15, wherein the composition of the Zn—Al—Mg-based alloy layer formed by hot-dipping on the surface of the base steel sheet comprises, in terms of ° k by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

17. A method for producing a plated steel sheet for use in forming automobile underbody members having a Zn—Al—Mg-based alloy layer formed by hot-dipping on a surface of a base steel sheet, the method comprising a step of sequentially processing a steel sheet that consists of, in terms of % by mass, C of from 0.035 to 0.100%, Si of at most 1.00° k, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.100%, and further consisting of at least one of Nb of at most 0.10% and V of at most 0.10% and a balance of Fe and inevitable impurities, for hot rolling, pickling, and annealing and Zn—Al—Mg-based hot-dipping in a continuous hot-dipping line to thereby produce a plated steel sheet having, on the surface of the base steel sheet, a Zn—Al—Mg-based plating layer formed thereon, wherein:

the steel sheet is hot-rolled to have a thickness t (mm), with which the liquid metal embrittlement cracking sensitivity index HI value thereof represented by the following formula (1) is at most 2.84, the coiling temperature is from 550 to 680° C., and the annealing temperature in the continuous hot-dipping line is from 500 to 700° C.:

$$HI\ \text{Value} = C/0.2 + Si/5.0 + Mn/1.3 + 0.4t \quad (1),$$

in the site of the element symbol in the formula (1), the content of the corresponding element (% by mass) in the base steel sheet is introduced.

18. The method for producing a Zn—Al—Mg-based alloy plated steel sheet according to claim 17, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

19. A method for producing a plated steel sheet for use in forming welded structural members having a Zn—Al—Mg-based alloy layer formed by hot-dipping on the surface of the base steel sheet; the method comprising a step of sequentially processing a steel sheet that consists of, in terms of % by mass, C of from 0.035 to 0.100%, Si of from 0.01 to 1.00%, Mn of from 0.50 to 2.50%, P of from 0.005 to 0.050%, S of from 0.001 to 0.020%, N of from 0.001 to 0.005%, Ti of from 0.02 to 0.20%, B of from 0.0005 to 0.0100%, Al of from 0.005 to 0.100%, Cr of from 0 to 1.00%, Nb of from 0 to 0.10%, V of from 0 to 0.10%, and a balance of Fe and inevitable impurities, for hot rolling, pickling, and annealing and Zn—Al—Mg-based hot-dipping in a continuous hot-dipping line to thereby produce a plated steel sheet having, on the surface of the base steel sheet, a Zn—Al—Mg-based plating layer formed thereon, wherein:

the steel sheet is hot-rolled to have a thickness t (mm), with which the liquid metal embrittlement cracking sensitivity index H3 value thereof represented by the following formula (3) is at most 2.90, the coiling temperature is from 550 to 680° C., and the annealing temperature in the continuous hot-dipping line is from 500 to 700° C.:

$$H3\ \text{Value} = C/0.2 + Si/5.0 + Mn/1.3 + Cr/1.0 + [[Mo/1.2]] + 0.4t - 0.7Cr^{1/2} \quad (3)$$

in the site of the element symbol in the formula (3), the content of the corresponding element (% by mass) in the base steel sheet is introduced.

20. The method for producing a Zn—Al—Mg-based alloy plated steel sheet according to claim 19, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

21. A plated steel sheet for use in forming automobile underbody members having a Zn—Al—Mg-based alloy layer formed by hot-dipping on a surface of a base steel sheet, wherein the base steel sheet has a chemical composition consisting of, in terms of % by mass, C of from 0.035 to 0.100%, Si of at most 1.00%, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.100%, Cr of at most 1.00%, further consisting of at least one of Nb of at most 0.10% and V of at most 0.10% and a balance of Fe and inevitable impurities, and has a ferrite single phase metallographic structure in which Ti-containing precipitates having a mean particle diameter of at most 20 nm are dispersed, and wherein the liquid metal embrittlement cracking sensitivity index H2 value of the base steel sheet represented by the following formula (2) and indicating the relationship between the contents of the steel components and the thickness t (mm) of the steel sheet is at most 3.24:

$$\text{H2 Value} = C/0.2 + Si/5.0 + Mn/1.3 + Cr/1.0 + [[Mo/1.2]] + 0.4t \quad (2)$$

in the site of the element symbol in the formula (2), the content of the corresponding element (% by mass) in the base steel sheet is introduced.

22. The plated steel sheet of claim 21, wherein the base steel sheet is a hot-rolled sheet.

23. The Zn-Ai-Mg-based alloy plated steel sheet according to claim 21, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

24. A method for producing a plated steel sheet for use in forming automobile underbody members having a Zn—Al—Mg-based alloy layer formed by hot-dipping on a surface of a base steel sheet, the method comprising a step of sequentially processing a steel sheet that consists of C of from 0.035 to 0.100%, Si of at most 1.00%, Mn of from 1.00 to 2.50%, P of at most 0.050%, S of at most 0.020%, N of at most 0.005%, Ti of from 0.02 to 0.20%, B of from 0.0005 to 0.0100%, Al of at most 0.001%, Cr of at most 1.00%, further consisting of at least one of Nb of at most 0.10% and V of at most 0.10% and a balance of Fe and inevitable impurities, for hot rolling, pickling, and annealing and Zn—Al—Mg-based hot-dipping in a continuous hot-dipping line to thereby produce a plated steel sheet having, on the surface of the base steel sheet, a Zn—Al—Mg-based plating layer formed thereon, wherein:

the steel sheet is hot-rolled to have a thickness t (mm), with which the liquid metal embrittlement cracking sensitivity index H2 value thereof represented by the following formula (2) is at most 3.24, the coiling temperature is from 550 to 680° C., and the annealing temperature in the continuous hot-dipping line is from 500 to 700° C.:

$$\text{H2 Value} = C/0.2 + Si/5.0 + Mn/1.3 + Cr/1.0 + [[Mo/1.2]] + 0.4t \quad (2)$$

in the site of the element symbol in the formula (2), the content of the corresponding element (% by mass) in the base steel sheet is introduced.

25. The method for producing a Zn—Al—Mg-based alloy plated steel sheet according to claim 24, wherein the composition of the Zn—Al—Mg-based alloy layer formed by hot-dipping on the surface of the base steel sheet comprises, in terms of % by mass, Al of from 3.0 to 22.0%, Mg of from 0.05 to 10.0%, Ti of from 0 to 0.10%, B of from 0 to 0.05%, Si of from 0 to 2.0%, Fe of from 0 to 2.0%, and a balance of Zn and inevitable impurities.

* * * * *